(12) United States Patent
Morikawa et al.

(10) Patent No.: US 8,703,314 B2
(45) Date of Patent: Apr. 22, 2014

(54) PRISMATIC BATTERY

(75) Inventors: Takaharu Morikawa, Osaka (JP); Toru Takai, Kyoto (JP)

(73) Assignee: Panasonic Corporation, Osaka (JP)

( * ) Notice: Subject to any disclaimer, the term of this patent is extended or adjusted under 35 U.S.C. 154(b) by 132 days.

(21) Appl. No.: 13/141,964

(22) PCT Filed: Mar. 5, 2010

(86) PCT No.: PCT/JP2010/001544
§ 371 (c)(1),
(2), (4) Date: Jun. 23, 2011

(87) PCT Pub. No.: WO2010/100940
PCT Pub. Date: Sep. 10, 2010

(65) Prior Publication Data
US 2012/0058373 A1 Mar. 8, 2012

(30) Foreign Application Priority Data
Mar. 5, 2009 (JP) .................................. 2009-051714

(51) Int. Cl.
*H01M 10/02* (2006.01)
*H01M 4/00* (2006.01)
*H01M 6/10* (2006.01)

(52) U.S. Cl.
USPC ............. 429/94; 429/127; 429/128; 429/131; 429/133; 429/140; 429/142; 429/144

(58) Field of Classification Search
None
See application file for complete search history.

(56) References Cited

FOREIGN PATENT DOCUMENTS

| JP | 2000-021452 | * | 1/2000 | ............ H01M 10/40 |
|----|-------------|---|--------|------------------------|
| JP | 2000-077091 |   | 3/2000 |                        |
| JP | 2001-273881 | * | 10/2001 | ............ H01M 2/26 |
| JP | 2003-257406 |   | 9/2003 |                        |

* cited by examiner

*Primary Examiner* — Barbara Gilliam
*Assistant Examiner* — Angela Martin
(74) *Attorney, Agent, or Firm* — McDermott Will & Emery LLP

(57) ABSTRACT

A prismatic battery includes an electrode assembly including: a positive electrode including a belt-shaped positive electrode core member and a positive electrode active material layer formed on both surfaces thereof; a negative electrode including a belt-shaped negative electrode core member and a negative electrode active material layer formed on both surfaces thereof; and a belt-shaped separator. The electrode assembly is formed by winding the positive electrode, the negative electrode, and the separator in the longitudinal directions thereof. The negative electrode has, in an end portion thereof from which winding is started, a one-sided active material layer portion in which the negative electrode active material layer is provided only on one surface of the negative core member. The one-sided active material layer portion terminates at a predetermined position between positions at which the negative electrode is folded for the second time and for the third time.

5 Claims, 5 Drawing Sheets

PRISMATIC BATTERY

RELATED APPLICATIONS

This Application is the U.S. National Phase under 35 U.S.C. §371 of International Application No. PCT/JP2010/001544, filed on Mar. 5, 2010, which in turn claims the benefit of Japanese Application No. 2009-051714, filed on Mar. 5, 2009, the disclosures of which Applications are incorporated by reference herein.

BACKGROUND ART

The present invention relates to a technique for improving the capacity of prismatic batteries.

TECHNICAL FIELD

In recent years, audio-visual equipment and electric equipment such as personal computers are rapidly becoming portable and cordless. Further, portable communication equipment such as cellular phones is rapidly becoming widely used. Conventionally, nickel-cadmium batteries and nickel-metal hydride batteries have been mainly used as a driving power source for such portable electric equipment.

However, with the improvement in performance and functions of portable electric equipment, there is an increasing demand for a secondary battery with higher voltage and higher capacity that can be used as a power source therefor. For this reason, at present, non-aqueous electrolyte batteries represented by lithium ion batteries, which are high in energy density by volume as well as in energy density by weight, are gaining popularity as a power source for portable electric equipment. Non-aqueous electrolyte batteries are advantageous also in that they can be charged rapidly and are excellent in safety.

Non-aqueous electrolyte batteries typically include an electrode assembly formed by spirally winding a positive electrode sheet and a negative electrode sheet with a separator interposed therebetween, into layers. In these days, an increasing number of non-aqueous electrolyte batteries are formed into a flat prismatic shape because it is suitable for reducing the thickness of the equipment and is highly effective in space utilization.

In association with this, various sizes of prismatic batteries different in length, width and thickness are becoming available. In addition, various improvements are being made to the method of layering to form an electrode assembly.

FIG. 5 is partially enlarged cross-sectional view of an electrode assembly in a conventional prismatic battery. An electrode assembly 100 shown in the figure is formed by spirally winding a belt-like positive electrode 121 and a belt-like negative electrode 122 with a belt-like separator 123 interposed therebetween. The positive electrode 121 includes a belt-like positive electrode core member (current collector) 121a made of a conductive material and a positive electrode active material layer 121b formed on both surfaces thereof, and the negative electrode 122 includes a belt-like negative electrode core member (current collector) 122a made of a conductive material and a negative electrode active material layer 122b formed on both surfaces thereof. In winding the electrode assembly 100, the negative electrode 122 is sandwiched between two separators 123, and then winding these together with the positive electrode 121.

In FIG. 5, there is a space 101a inside the electrode assembly 100. However, actually, the space 101a is eliminated because the positive electrode 121, the negative electrode 122, and the separator 123 have flexibility.

In the electrode assembly 100 shown in the figure, an end portion of the positive electrode 121 from which winding is started (i.e., the left-side end portion of a first layer P101) is more inward (closer to the right side of the figure) than an end portion of the negative electrode 122 from which winding is started (i.e., the left-side end portion of a first layer N101).

In the end portion of the negative electrode 122 from which winding is started, the negative electrode active material layer 122b is formed only on one surface of the negative electrode core member 122a. On the other surface of the negative electrode core member 122a where no negative electrode active material layer 122b is formed, the negative electrode core member 122a is exposed. To the exposed surface, a negative electrode lead 124 is welded.

With regard to the positive electrode 121, although not shown, one surface of the positive electrode core member 121a is exposed at an end portion thereof where winding of the electrode assembly 100 is finished (which is positioned near the right-side end of the electrode assembly 100). To the exposed surface, a positive electrode lead is welded.

The first layer P101 of the positive electrode 121 and the first layer N101 of the negative electrode 122 are folded in a folding portion at the right-side end (not shown) of the electrode assembly 100. The first layers P101 and N101 folded in the folding portion continue as second layers P102 and N102. The second layers P102 and N102 are folded in a folding portion 125 at the left-side end of the electrode assembly 100. In these folding portions, the positive electrode 121 and the negative electrode 122 are curved. The second layers P102 and N102 folded in the folding portion 125 at the left-side end of the electrode assembly 100 continue as third layers P103 and N103.

In such a manner as described above, the positive electrode 121 and the negative electrode 122 are wound spirally into layers.

In the electrode assembly 100 shown in the figure, the following portions have no positive electrode active material layer 121b to be paired with: a portion of the negative electrode 122 to which the negative electrode lead 124 is welded; a negative electrode active material layer (N101a) on the upper side of the first layer N101 of the negative electrode 122; and a negative electrode active material layer (N102a) on the lower side of the second layer N102. Therefore, these portions of the negative electrode active material layer 122b make no contribution to power generation of the battery.

In order to solve this, one proposal suggests that, as shown in FIG. 6, in a first layer N111 and a second layer N112 of a negative electrode 126, a negative electrode active material layer 126b be formed only on one surface of a negative electrode core member 126a, and in a third layer N113 and subsequent layers, the negative electrode active material layer 126b be formed on both surfaces of the negative electrode core member 126a (see, e.g., Patent Literature 1).

CITATION LIST

Patent Literature

[PTL 1] Japanese Laid-Open Patent Publication No. 2003-257406

SUMMARY OF INVENTION

Technical Problem

However, according to the configuration of FIG. 6, in a folding portion 127 at the left-side end of an electrode assembly 110, the innermost layer is singly formed of a portion in which the active material layer 126b is formed only on one surface of the negative electrode core member 126a (hereinafter referred to as a "one-sided active material layer portion"). On the other hand, in a folding portion (not shown) at the right-side end of the electrode assembly 110, the innermost layer is formed of a pair of the positive electrode 121 and a one-sided active material layer portion of the negative electrode 126.

For the reason above, according to the configuration shown in FIG. 6, in the electrode assembly, the radius of curvature of the folding portion on the side where the positive and negative electrodes are folded for the second time (the left-side end in FIG. 6) is smaller than that of the folding portion on the side opposite thereto. As a result, the total area of the electrodes in the folding portion becomes different between the opposite ends of the electrode assembly.

The difference in the total area of the electrodes between the folding portions results in a difference in thickness between the opposite ends of the electrode assembly. This leads to variations in thickness in the width direction of the electrode assembly, failing to fully utilize the volume of the battery case. In other words, the total area of the electrodes, i.e., the amount of the active material, which can be accommodated in a battery case of the same volume, is reduced. This is an obstacle to achieve a higher capacity of the prismatic battery.

Solution to Problem

One aspect of the present invention is a prismatic battery including: an electrode assembly which includes a positive electrode including a belt-like positive electrode core member and a positive electrode active material layer formed on both surfaces of the positive electrode core member, a negative electrode including a belt-like negative electrode core member and a negative electrode active material layer formed on both surfaces of the negative electrode core member, and a belt-like separator interposed between the positive electrode and the negative electrode; and a battery case accommodating the electrode assembly.

The electrode assembly is formed by winding the positive electrode, the negative electrode, and the separator in the longitudinal directions thereof. The electrode assembly has: a flat portion in which the positive electrode, the negative electrode, and the separator are laid flat; and folded portions in each of which the positive electrode, the negative electrode, and the separator are curved and folded, the folded portions being adjacent to the flat portion.

The negative electrode has, in an end portion thereof from which winding is started, a one-sided active material layer portion in which the negative electrode active material layer is provided only on one surface of the negative core member. The one-sided active material layer portion terminates at a first predetermined position between a position at which the negative electrode is folded for the second time and a position at which the negative electrode is folded for the third time.

Advantageous Effects of Invention

According to the present invention, it is possible to suppress variations in thickness of an electrode assembly in the width direction thereof, thereby to easily provide a prismatic battery with higher capacity.

[IG. 4] A partially enlarged cross-sectional view of an electrode assembly to show the details thereof.

Figure 5:
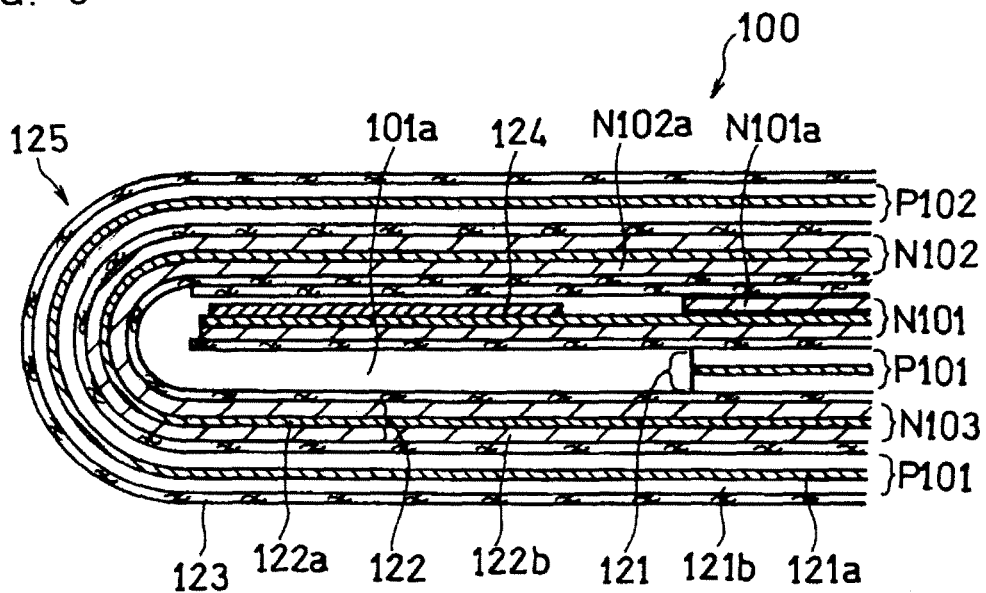

[FIG. 5] A partially enlarged cross-sectional view of a conventional electrode assembly to show the details thereof.

Figure 6:
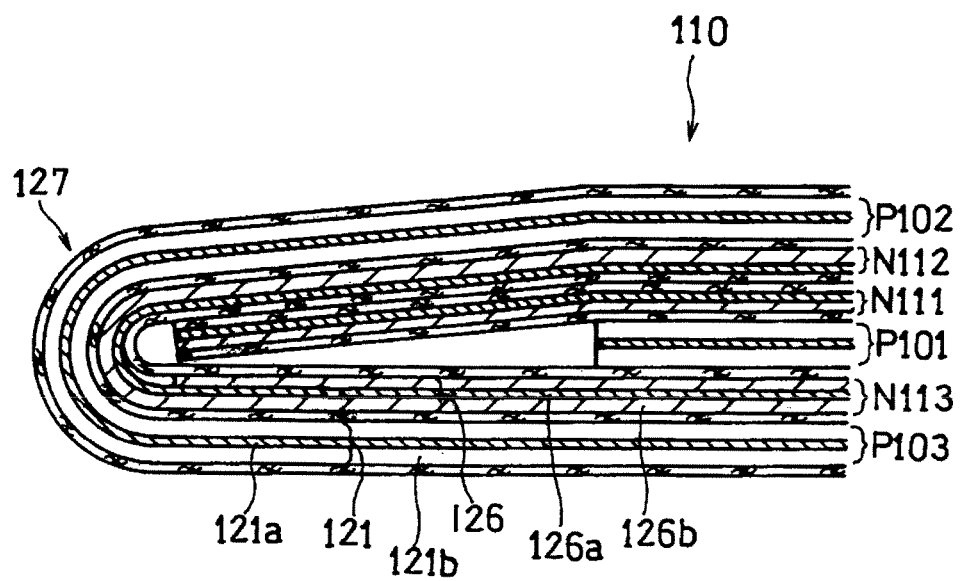

[FIG. 6] A partially enlarged cross-sectional view of another conventional electrode assembly to show the details thereof.

DESCRIPTION OF EMBODIMENTS

One aspect of the present invention relates to a prismatic battery including: an electrode assembly which includes a positive electrode including a belt-like positive electrode core member and a positive electrode active material layer formed on both surfaces of the positive electrode core member, a negative electrode including a belt-like negative electrode core member and a negative electrode active material layer formed on both surfaces of the negative electrode core member, and a belt-like separator interposed between the positive electrode and the negative electrode; and a battery case accommodating the electrode assembly. The electrode assembly is formed by winding the positive electrode, the negative electrode, and the separator in the longitudinal directions thereof. The electrode assembly has: a flat portion in which the positive electrode, the negative electrode, and the separator are laid flat; and folded portions in each of which the positive electrode, the negative electrode, and the separator are curved and folded, the folded portions being adjacent to the flat portion.

The negative electrode has, in an end portion thereof from which winding is started, a one-sided active material layer portion in which the negative electrode active material layer is provided only on one surface of the negative core member. The one-sided active material layer portion terminates at a first predetermined position between a position at which the negative electrode is folded for the second time and a position the negative electrode is folded for the third time.

By configuring as above, it is possible to prevent the radius of curvature of the folding portion on the side where the negative electrode is folded for the first and third times from being smaller as a whole than that of the folding portion on the side opposite thereto. As a result, the difference between the total area of the electrodes in one folding portion and that in the other folding portion can be reduced. This results in little or no difference in thickness between the opposite ends of the electrode assembly. Accordingly, variations in thickness of the electrode assembly in the width direction thereof can be reduced. As such, the total area of the electrodes that can be accommodated in a battery case of the same volume can be increased. Consequently, the electrode assembly can be accommodated in a battery case such that the volume of the battery case can be fully utilized. Thus, a prismatic battery with higher capacity can be easily provided.

According to another aspect of the present invention, at a position at which the negative electrode is folded for the first time, the negative electrode active material layer in the one-sided active material layer portion is outside the negative electrode core member.

By this configuration, the electrode assembly can be wound, while the positive electrode is positioned outside the negative electrode in the folding portion. As a result, the radius of curvature of the positive electrode becomes large as a whole, and the separation of the positive electrode active material can be suppressed.

According to further another aspect of the present invention, an end portion of the positive electrode from which winding is started is adjacent to the negative electrode active material layer in the one-sided active material layer portion, with the separator interposed therebetween, and a winding start position of the positive electrode corresponds to a second predetermined position between the position at which the negative electrode is folded for the first time and the position at which the negative electrode is folded for the second time.

By this configuration, the winding of the positive electrode can be started from the flat portion of the electrode assembly, and therefore, the radius of curvature of the positive electrode when folded for the first time can be as large as possible. Therefore, it is possible to suppress the separation of the positive electrode active material and, at the same time, to achieve a higher capacity of the prismatic battery.

More specifically, if the winding start position of the positive electrode sheet is positioned within the folding portion in the electrode assembly, the radius of curvature of the portion near the winding start position becomes small, and thus the positive electrode active material layer in this portion is easily separated. Therefore, the winding start position of the positive electrode is preferably positioned within the flat portion. However, if the winding start position of the positive electrode is positioned as above, even though the negative electrode active material layers are provided on both surfaces of the negative electrode core member, one of the negative electrode active material layers has no positive electrode active material layer that is effectively paired therewith, until the positive electrode is folded twice and wound once. This portion of the negative electrode active material layer makes no contribution to power generation.

For the reason as described above, conventionally, the negative electrode active material has been provided on only one surface of the negative electrode core member until the positive electrode passes the folding portion where the positive electrode is folded for the second time (the folding portions 125 and 127 in FIGS. 5 and 6). It has been intended to decrease the amount of negative electrode active material layer that makes no contribution to power generation by doing this, and thereby to more efficiently use the volume of the battery case.

However, the recent research by the present inventors revealed that providing the negative electrode active material layer on only one surface of the negative electrode core member until the positive electrode passes the folding portion where the positive electrode is folded for the second time makes the radius of curvature of that folding portion small as a whole. This causes variations in thickness of the electrode assembly in the width direction thereof, failing to efficiently use the volume of the battery case. As a result, the capacity of the prismatic battery is reduced contrary to the initial purpose.

Based on the foregoing finding, in the present invention, the negative electrode active material layer is intentionally provided on both surfaces of the negative electrode core member from a position before the folding portion where the positive electrode is folded for the second time, although part of the negative electrode active material layer makes no contribution to power generation. This increases the radius of curvature as a whole of the folding portion where the positive electrode is folded for the second time. This reduces variations in thickness of the electrode assembly in the width direction thereof, and thus increases the total area of the electrodes that contribute power generation as a whole. Therefore, the battery capacity can be increased.

According to yet another aspect of the present invention, a winding start position of the negative electrode is aligned with the first predetermined position, and the winding start position of the positive electrode is closer to the position at which the negative electrode is folded for the second time than to the first predetermined position.

By this configuration, it is possible to wind the electrode assembly without causing severe stress to the positive and negative electrodes. Therefore, the separation of the active material layer can be suppressed.

According to still another aspect of the present invention, the winding start position of the positive electrode is 1 to 4 mm from a boundary between the flat portion and the folding portion on a side where the negative electrode is folded for the first time. By this configuration, it is possible to wind the electrode assembly without causing severe stress to the positive and negative electrodes and to minimize the area of the negative electrode active material layer that makes no contribution to power generation. The boundary between the folding portion and the flat portion is a plane including the line along which the negative electrode is folded for the first time (i.e., a plane denoted by a dot-dot-dash line 10a in FIG. 4). This plane is orthogonal to the direction along the plane of the flat portion and to the winding direction of the electrode assembly (i.e., the left-right direction in FIG. 1).

According to yet another aspect of the present invention, the first predetermined position is 0.3 to 3.5 mm from the boundary between the flat portion and the folding portion on the side where the negative electrode is folded for the first time.

This prevents severe stress from being caused to the negative electrode at a position where the one-sided negative electrode active material layer portion terminates, that is, at a position where the negative electrode active material layer starts to be formed on both surfaces of the negative electrode core member, and thus, the separation of the negative electrode active material layer can be suppressed. Further, the area of the negative electrode active material layer that makes no contribution to power generation can be minimized.

An embodiment of the present invention is described below with reference to the appended drawings.

Figure 1:
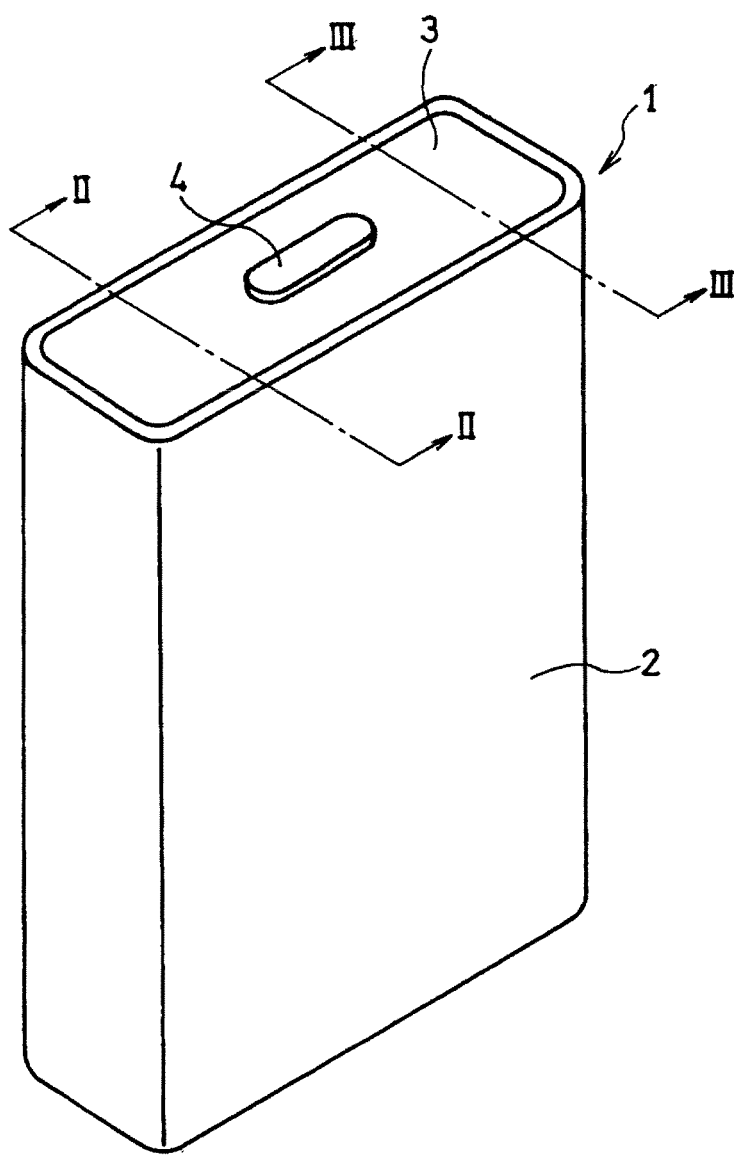
[FIG. 1] A perspective view showing the appearance of a prismatic battery according to one embodiment of the present invention.
Figure 2:
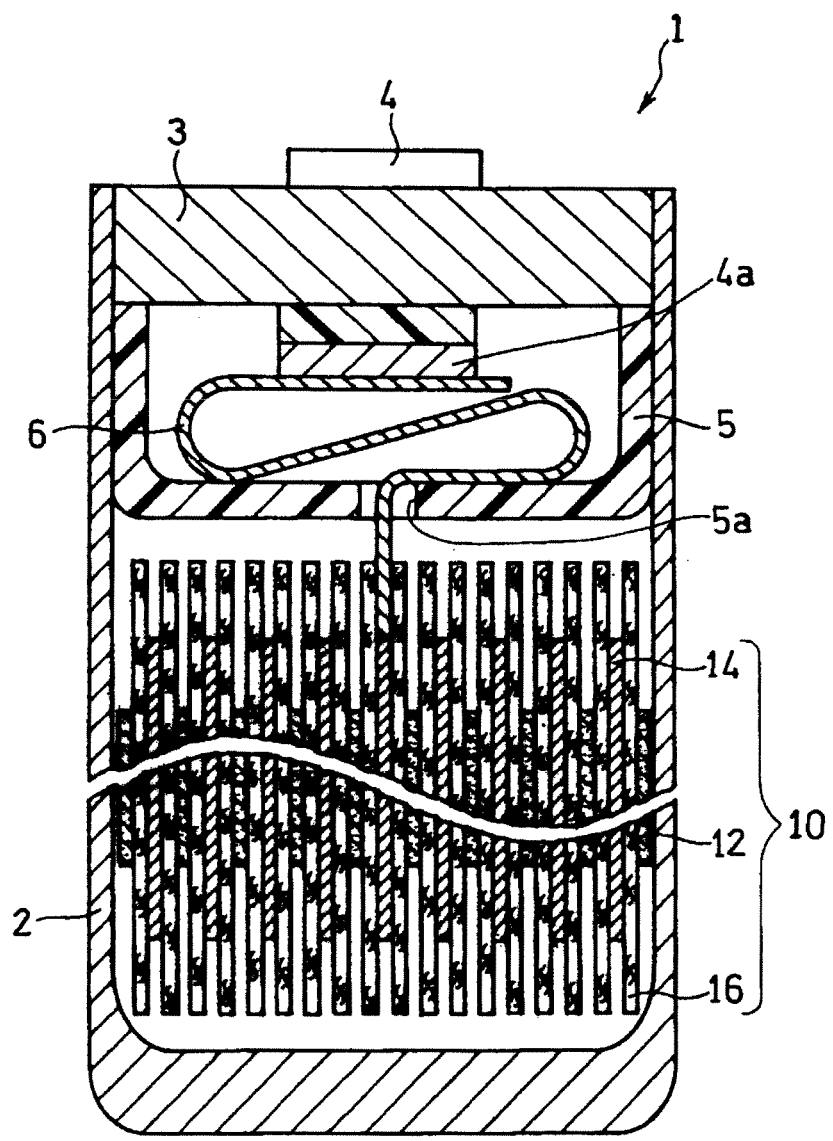
[FIG. 2] An enlarged cross-sectional view taken along the line II-II of FIG. 1.
Figure 3:
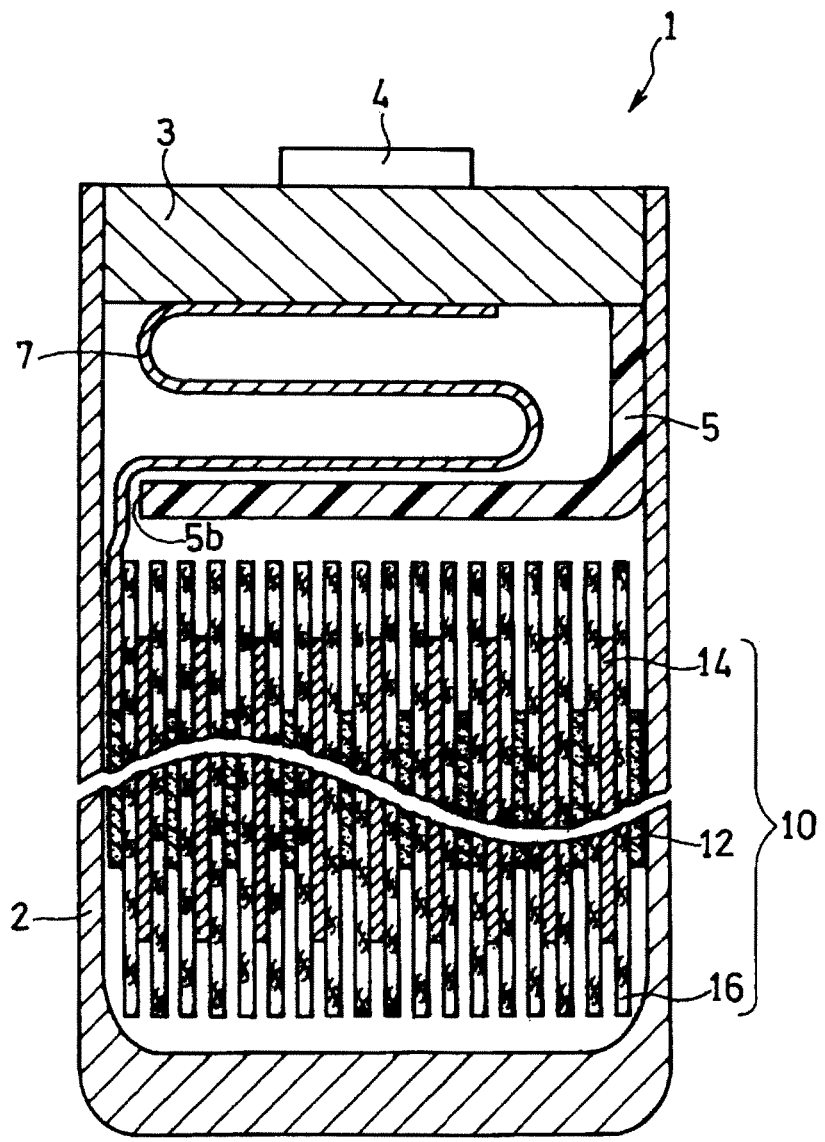
[FIG. 3] An enlarged cross-sectional view taken along the line III-III of FIG. 1.

FIG. 1 is a perspective view showing the appearance of a prismatic battery according to one embodiment of the present invention. FIG. 2 is an enlarged cross-sectional view taken along the line II-II of FIG. 1. FIG. 3 is an enlarged cross-sectional view taken along the line III-III of FIG. 1.

A prismatic battery 1 includes a square battery case 2 having an opening, and a sealing plate 3 for sealing the opening. The battery case 2 and the sealing plate 3 are made of, for example, aluminum or an aluminum alloy.

The periphery of the sealing plate 3 is laser-welded to the opening of the battery case 2. The sealing plate 3 is provided with a negative electrode external terminal 4 electrically insulated from the sealing plate 3. The battery case 2 and the sealing plate 3 function as a positive electrode external terminal.

As shown in FIG. 2, an electrode assembly 10 is accommodated together with an electrolyte (not shown) in the battery case 2. The electrode assembly 10 includes a positive electrode 12, a negative electrode 14, and a separator 16. The negative electrode external terminal 4 is connected to a negative electrode internal terminal 4a. Between the negative electrode internal terminal 4a and the electrode assembly 10, a frame member 5 made of an electrically insulating material is provided. At the center of the frame member 5, a negative electrode lead insertion hole 5a for inserting a negative electrode lead 6 therethrough is provided. The negative electrode internal terminal 4a is connected to the negative electrode 14 by the negative electrode lead 6 inserted through the negative electrode lead insertion hole 5a.

As shown in FIG. 3, at the end of the frame member 5, a positive electrode lead insertion clearance 5b for inserting a positive electrode lead 7 therethrough is provided. The sealing plate 3 is connected to the positive electrode 12 by the positive electrode lead 7 inserted through the positive electrode lead insertion clearance 5b.

Figure 4:
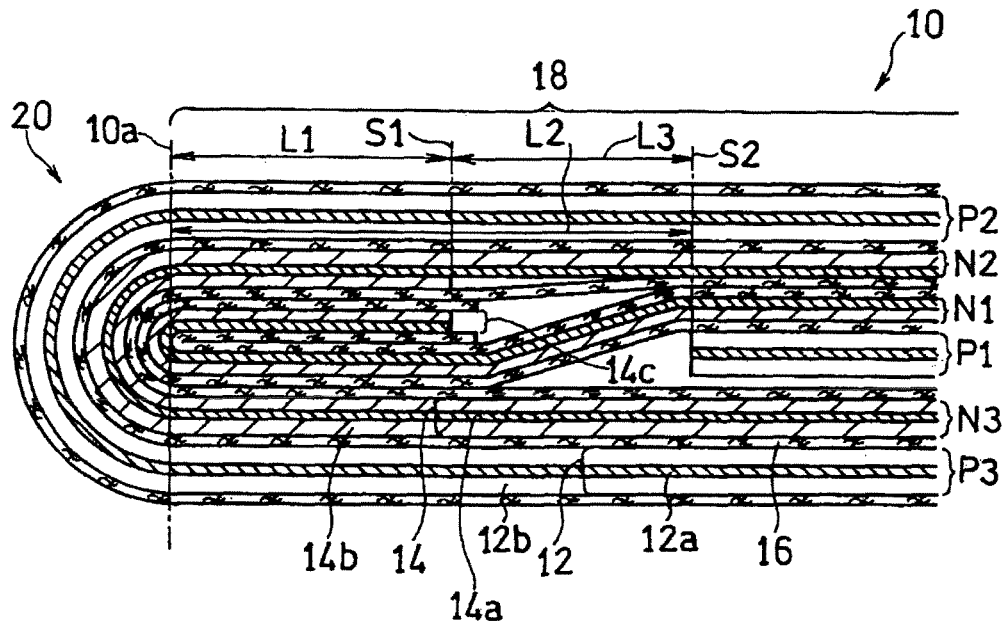

FIG. 4 is a partially enlarged cross-sectional view to show the details of an electrode assembly.

The electrode assembly 10 includes the belt-like positive electrode 12, the belt-like negative electrode 14, and the belt-like separator 16 interposed between the positive electrode 12 and the negative electrode 14. The positive electrode 12, the negative electrode 14, and the separator 16 are wound spirally. The electrode assembly 10 includes a flat portion 18 in which the positive electrode 12, the negative electrode 14, and the separator 16 are laid flat, and folded portions in each of which the positive electrode 12, the negative electrode 14, and the separator 16 are curved and folded. The folded portions are formed at both ends of the flat portion 18 and are adjacent to the flat portion 18. In FIG. 1, only one of the folded portions at both ends (hereinafter referred to as a "one-end folding portion") 20 is shown.

The positive electrode 12 includes a belt-like positive electrode core member (current collector) 12a made of a conductive material, and a positive electrode active material layer 12b formed on both surfaces of the positive electrode core member 12a. The negative electrode 14 includes a belt-like negative electrode core member (current collector) 14a made of a conductive material, and a negative electrode active material layer 14b formed on both surfaces of the negative electrode core member 14a.

Winding of the negative electrode 14 is started from a position within the flat portion 18 and near a boundary 10a with the one-end folding portion 20. A distance L1 between a winding start position S1 of the negative electrode and the boundary 10a may be 0.3 to 3.5 mm. The distance L1 is more preferably within the range of 0.5 to 2.5 mm. The end portion from which winding is started of the negative electrode 14 is a one-sided active material layer portion 14c in which the negative electrode active material layer 14b is provided only on one surface of the negative core member 14a.

The negative electrode 14 is curved in the one-end folding portion 20 and folded for the first time. The negative electrode 14 that has been folded for the first time is combined with the end portion from which winding is started of the positive electrode 12 at a position beyond the winding start position S1, and wound together with the positive electrode 12. A distance L2 between a winding start position S2 of the positive electrode 12 and the above boundary is preferably 1 to 4 mm. A distance L3 between the position S1 and the position S2 is preferably 0.5 to 3.2 mm. By setting the distance L3 within this range, it is possible to prevent severe stress from being caused to the positive electrode 12 and the negative electrode 14. Consequently, the separation of the active material layer can be suppressed. In addition, the length of the negative electrode active material layer 14b that does not effectively faces the positive electrode active material layer can be minimized in the end portion from which winding is started of the negative electrode 14.

The positive electrode 12 and the negative electrode 14 are curved and folded in the folding portion at the other end (not shown) (hereinafter referred to as the "other-end folding portion). The positive electrode 12 before being folded for the first time in the other-end folding portion is referred to as a first layer P1. The negative electrode 14 after having been combined with the positive electrode 12 and before being folded for the second time in the other-end folding portion is referred to as a first layer N1.

The positive electrode 12 having been folded for the first time in the other-end folding portion continues as a second layer P2, while the negative electrode 14 having been folded for the second time in the other-end folding portion continues as a second layer N2. The positive electrode 12 is folded for the second time in the one-end folding portion 20 and continues as a third layer P3, while the negative electrode 14 is folded for the third time in the one-end folding portion 20 and continues as a third layer N3. It should be noted that in FIG. 4, there is a gap between the first layer P1 of the positive electrode 12 and the third layer N3 of the negative electrode 14; however, actually, the first layer P1 of the positive electrode 12 and the third layer N3 of the negative electrode 14 are adjacent to each other with the separator 16 interposed therebetween.

The one-sided active material layer portion 14c of the negative electrode 14 terminates near the one-end folding portion 20 of the second layer N2, more specifically, at a position corresponding to the winding start position S1 of the negative electrode, and from this position, the negative electrode 14 has the negative electrode active material layers 14b formed on both surfaces of the negative electrode core member 14a. In other words, the negative electrode 14 is folded for the third time after the start of winding, with the negative electrode active material layers 14b being formed on both surfaces of the negative electrode core member 14a.

Examples of the present invention are specifically described below. The present invention is not limited to the examples below, and various modifications may be made without departing from the scope of the invention.

EXAMPLE 1

(1) Production of Positive Electrode

A positive electrode was produced in the following manner.

A positive electrode active material ($LiNi_{0.8}Co_{0.15}Al_{0.05}O_2$), acetylene black serving as a conductive agent, and PVdF (PolyVinylidene Fluoride) serving as a binder were blended in a weight ratio of 90:5:5, and kneaded together in a double arm kneader, while NMP (N-methylpyrrolidone) was added thereto as a dispersion medium. A positive electrode slurry was thus prepared.

The positive electrode slurry was applied onto both surfaces of a 15-mm-thick positive electrode core member (current collector) made of aluminum foil. The positive electrode core member with the slurry thereon was dried in a 120° C. atmosphere, to remove NMP therefrom, and then rolled with a roll press to a thickness of 115 μm (the thickness of the positive electrode active material layer on one surface was 50 μm), followed by cutting into a predetermined size, whereby a positive electrode was obtained. The thickness of the positive electrode core member may be within the range of 10 to 15 μm. The thickness of the positive electrode may be within the range of 100 to 150 μm.

Thereafter, a positive electrode lead of 2.5 mm in width and 0.1 mm in thickness was welded to a portion where the positive electrode core member was exposed with no positive electrode active material layer formed thereon, the portion being provided at the end portion of the positive electrode where winding was finished.

(2) Production of Negative Electrode

A negative electrode was produced in the following manner.

A purified natural graphite coated with a pitch-based amorphous layer was used as a negative electrode active material. This negative electrode active material, CMC (CarboxyMethylCellulose) serving as a thickener, and SBR (Styrene-Butadiene Rubber) serving as a binder were blended in a weight ratio of 100:2:2. These were kneaded together in a double arm kneader, while water was added thereto as a dispersion medium, to give a negative electrode slurry.

The negative electrode slurry was applied onto both surfaces of a 10-mm-thick negative electrode core member (current collector) made of copper foil, and dried in a 200° C. atmosphere, to remove water therefrom. The negative electrode core member with the slurry thereon was rolled with a roll press to a thickness of 150 μm (the thickness of the negative electrode active material layer on one surface was 80 μm), followed by cutting into a predetermined size, whereby a negative electrode was obtained. The thickness of the positive electrode core member may be within the range of 7 to 10 μm. The thickness of the negative electrode active material layer on one surface may be within the range of 100 to 180 μm.

Thereafter, a negative electrode lead of 3.0 mm in width and 0.1 mm in thickness was welded to the negative electrode core member exposed in the one-sided active material layer portion at the end portion from which winding is started of the negative electrode.

(3) Preparation of Non-aqueous Electrolyte

A non-aqueous electrolyte was prepared by dissolving $LiPF_6$ serving as an electrolyte at a concentration of 1.1 mol/L in a non-aqueous solvent composed of EC (Ethylene carbonate) and EMC (Ethyl Methyl Carbonate) mixed in a volume ratio of 2:8.

(4) Fabrication of Prismatic Battery

The positive electrode and negative electrode obtained as above were wound spirally with a 20-mm-thick separator made of a PE (polyethylene) microporous film interposed therebetween, as shown in FIG. 4, to form an electrode assembly having a flat square cross-sectional shape. The thickness of the separator may be within the range of 12 to 20 μm.

The electrode assembly was formed such that the winding of the negative electrode was started from the position within the flat portion, with the distance L1 between a winding start position and the boundary with the folding portion where the negative electrode was folded for the first time (see FIG. 4) being set to 2 mm. The end portion from which winding is started of the negative electrode was composed of a one-sided active material layer portion in which the negative electrode active material layer was formed only on one surface of the negative core member. The one-sided active material layer portion was folded such that the negative electrode core member faced inward and the negative electrode active material layer faced outward.

The one-sided active material layer portion terminated at a position before the folding portion where the negative electrode was folded for the third time. From this position, the negative electrode active material layer was formed also on the inward surface of the negative electrode core member. The position was aligned with the winding start position of the negative electrode. In other words, the position from which the formation of the negative electrode active material layer on the inward surface of the negative electrode core member was started was also at 2 mm from the boundary between the flat portion and the folded portion.

The positive electrode was wound together with the negative electrode after the negative electrode has been folded for the first time, such that the positive electrode faced the negative electrode active material layer formed in the one-sided active material layer portion. The distance L2 between the winding start position of the positive electrode and the above boundary was 3.5 mm.

The electrode assembly configured as described above was accommodated in a bottomed prismatic battery case. The negative electrode lead extended from the top of the electrode assembly was laser-welded to a negative electrode internal terminal. The positive electrode lead extended from the top of the electrode assembly was laser-welded to a sealing plate.

Subsequently, the non-aqueous electrolyte prepared as above was injected into the battery case, and the opening of the battery case was sealed by the sealing plate.

In the manner as described above, five prismatic lithium ion secondary batteries each having a height of 36 mm, a length of 34 mm and a width of 8.5 mm was fabricated.

EXAMPLE 2

Five lithium ion secondary batteries were fabricated in the same manner as in Example 1, except that the distance L1 (see FIG. 4) was set to 0.5 mm.

EXAMPLE 3

Five lithium ion secondary batteries were fabricated in the same manner as in Example 1, except that the distance L1 (see FIG. 4) was set to 2.5 mm.

EXAMPLE 4

Five lithium ion secondary batteries were fabricated in the same manner as in Example 1, except that the distance L1 (see FIG. 4) was set to 3.5 mm and the distance L2 was set to 4 mm.

EXAMPLE 5

Five lithium ion secondary batteries were fabricated in the same manner as in Example 1, except that the distance L1 (see FIG. 4) was set to 0.3 mm.

COMPARATIVE EXAMPLE 1

An electrode assembly in which the one-sided active material layer portion in the end portion from which winding is started of the negative electrode terminates at the left-side end of the third layer N113 as shown in FIG. 6 was produced. Five lithium ion secondary batteries were fabricated in the same manner as in Example 1, except that the electrode assembly thus produced was used.

<Evaluation>

With respect to five batteries each from Examples 1 to 5 and Comparative Example 1, the thickness, the discharge capacity, and the occurrence of separation of the active material layer were checked in the following manner.

First, a constant-current charging was performed at 250 mA in a 25° C. atmosphere, with a charge cut-off voltage set at 4.20 V. Subsequently, a constant-current discharging was performed at 250 mA in a 25° C. atmosphere, with a discharge cut-off voltage set at 2.50 V. This charging/discharging cycle was repeated 250 times in total, and the discharge capacity at the 251th cycle was measured. Upon measurement of the discharge capacity, the thickness at the center of each battery was measured with a vernier caliper.

After the measurement of the discharge capacity and the thickness, each battery was disassembled in a low-humidity atmosphere with dew point of −30° C., and the electrode assembly was taken out from the battery case, to check the winding start position of the negative electrode active material layer.

The results are shown in FIG. 1.

TABLE 1

|  | L1 (mm) | L2 (mm) | Thickness (mm) | Discharge capacity (mAh) |
|---|---|---|---|---|
| Example 1 | 2 | 3.5 | 8.65 | 1250 |
|  |  |  | 8.64 | 1248 |
|  |  |  | 8.66 | 1252 |
|  |  |  | 8.64 | 1249 |
|  |  |  | 8.65 | 1251 |
| Example 2 | 0.5 | 3.5 | 8.64 | 1249 |
|  |  |  | 8.65 | 1251 |
|  |  |  | 8.65 | 1252 |
|  |  |  | 8.63 | 1250 |
|  |  |  | 8.65 | 1248 |
| Example 3 | 2.5 | 3.5 | 8.65 | 1252 |
|  |  |  | 8.63 | 1251 |
|  |  |  | 8.64 | 1250 |
|  |  |  | 8.65 | 1251 |
|  |  |  | 8.66 | 1251 |
| Example 4 | 0.3 | 3.5 | 8.65 | 1252 |
|  |  |  | 8.64 | 1251 |
|  |  |  | 8.65 | 1250 |
|  |  |  | 8.66 | 1251 |
|  |  |  | 8.63 | 1251 |
| Example 5 | 3.5 | 4 | 8.65 | 1239 |
|  |  |  | 8.63 | 1239 |
|  |  |  | 8.64 | 1236 |
|  |  |  | 8.65 | 1241 |
|  |  |  | 8.66 | 1238 |
| Comparative Example 1 | — | 3.5 | 8.81 | 1235 |
|  |  |  | 8.64 | 1236 |
|  |  |  | 8.75 | 1234 |
|  |  |  | 8.63 | 1236 |
|  |  |  | 8.67 | 1235 |

As shown in Table 1, Examples 1 to 5 exhibited higher discharge capacities and smaller variations in battery thickness than Comparative Example 1.

In the batteries of Examples 1 to 5, the one-sided active material layer portion in the end portion from which winding is started of the negative electrode was folded shortly once, and the active material layer was formed on both surfaces of the negative electrode core member from a position before the folding portion where the negative electrode was folded for the third time. As such, the radius of curvature of this folding portion was larger as a whole than that in the Comparative Example 1. Consequently, the difference between the total area of the electrodes in this folding portion and that in the folding portion opposite thereto in Examples 1 to 5 was smaller than that in Comparative Example 1.

As a result, in Examples 1 to 5, the difference in thickness between the opposite ends of the electrode assembly was small. This was verified by actually measuring the thickness of each portion of the electrode assembly taken out from each disassembled battery of Examples 1 to 5 and Comparative Example 1. Hence, in Examples 1 to 5, the thickness of the electrode assembly is more uniform over the portions. As such, a larger area of electrodes, i.e., a larger amount of active material, can be accommodated in a battery case of the same volume. Therefore, a higher capacity of the battery can be easily achieved.

The battery of Example 5 exhibited a discharge capacity slightly lower than those of Examples 1 to 4. This is presumably because the distance L1 in Example 5 was as long as 3.5 mm, and thus the portion of the negative electrode that makes no contribution to power generation was too long. As a result, lithium was irreversibly intercalated into the negative electrode active material layer in this portion, resulted in a reduced discharge capacity.

The variations in thickness of the battery of Comparative Example 1 was large, presumably because the difference in the total area of the electrodes between the folding portions was large in Comparative Example 1, for which the change in thickness during repeated charging/discharging cycles was not stable, resulting in large variations.

In the battery of Example 4, a separation of the negative electrode active material layer was observed, though the amount was small, at the position where the one-sided active material layer portion terminated. This is presumably because the distance L1 was as short as 0.3 mm.

Although a lithium ion secondary battery was used as the prismatic battery in the above Examples, the present invention is suitably applicable to other prismatic batteries comprising non-aqueous electrolyte batteries.

[Industrial Applicability]

The prismatic battery of the present invention can provide a high capacity prismatic battery, and therefore, is useful, for example, as a main power source for electronic equipment, a main power source for consumer mobile tools such as cellular phones and notebook personal computers, a main power source for power tools such as electric screwdrivers, and an industrial main power source for electric vehicles.

| [Reference Signs List] | |
|---|---|
| 1 | Prismatic battery |
| 2 | Battery case |
| 3 | Sealing plate |
| 10a | Boundary |
| 12 | Positive electrode |
| 12a | Positive electrode core member |
| 12b | Positive electrode active material layer |
| 14 | Negative electrode |
| 14a | Negative electrode core member |
| 14b | Negative electrode active material layer |
| 14c | One-sided active material layer portion |
| 16 | Separator |
| 18 | Flat portion |
| 20 | One-end folding portion |

The invention claimed is:

1. A prismatic battery comprising: an electrode assembly which includes a positive electrode including a belt-shaped positive electrode core member and a positive electrode active material layer formed on both surfaces of the positive electrode core member, a negative electrode including a belt-shaped negative core member and a negative electrode active material layer formed on both surfaces of the negative electrode core member, and a belt-shaped separator interposed between the positive electrode and the negative electrode; and a battery case accommodating the electrode assembly, wherein the electrode assembly is formed by winding the positive electrode, the negative electrode, and the separator in the longitudinal directions thereof, and has a flat portion in which the positive electrode, the negative electrode, and the separator are laid flat, and folded portions in each of which the positive electrode, the negative electrode, and the separator are curved and folded, the folded portions being adjacent to the flat portion;

the negative electrode has, in an end portion thereof from which winding is started,
a one-sided active material layer portion in which the
negative electrode active material layer is provided
only on an outer surface of the negative core member,
the one-sided active material layer portion extending
at least to a first position between a position at which
the negative electrode is folded for the second time
and a position at which the negative electrode is
folded for the third time, and a two-sided negative-electrode active material layer portion in which the negative electrode active material
layer is provided both on the outer surface of the
negative electrode core member and on an inner surface of the negative electrode core member and which
extends from the first position, at least to a position at
which the negative electrode is folded for the fourth
time;

the positive electrode has, in an end portion thereof from
which winding is started, a two-sided positive-electrode
active material layer portion in which the positive electrode active material layer is provided both on an outer
surface of the positive electrode core member and on an
inner surface of the positive electrode core member; and in the two-sided positive-electrode active material layer
portion in the end portion of the positive electrode,
the positive electrode active material layer on the inner
surface of the positive electrode core member faces
the negative electrode active material layer included
in the one-sided active material layer portion of the
negative electrode, with the separator interposed therebetween, and the positive electrode active material layer on the outer
surface of the positive electrode core member faces
the negative electrode active material layer provided
on the inner surface of the negative electrode core
member and between the position at which the negative electrode is folded for the third time and a position at which the negative electrode is folded for the
fourth time.

2. The prismatic battery in accordance with claim 1,
wherein a winding start position of the positive electrode
corresponds to a second position between the position at
which the negative electrode is folded for the first time and the
position at which the negative electrode is folded for the
second time.

3. The prismatic battery in accordance with claim 2,
wherein, a winding start position of the negative electrode is
aligned with the first position, and the winding start position
of the positive electrode is closer to the position at which the
negative electrode is folded for the second time than to the
first position.

4. The prismatic battery in accordance with claim 2,
wherein, the winding start position of the positive electrode is
1 to 4 mm from a boundary between the flat portion and the
folding portion on a side where the negative electrode is
folded for the first time.

5. The prismatic battery in accordance with claim 1,
wherein, the first position is 0.3 to 3.5 mm from the boundary
between the flat portion and the folding portion on the side
where the negative electrode is folded for the first time.

\* \* \* \* \*